United States Patent
Nammi et al.

(10) Patent No.: US 11,418,992 B2
(45) Date of Patent: Aug. 16, 2022

(54) GENERATION OF DEMODULATION REFERENCE SIGNALS IN ADVANCED NETWORKS

(71) Applicant: AT&T Intellectual Property I, L.P., Atlanta, GA (US)

(72) Inventors: SaiRamesh Nammi, Austin, TX (US); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/440,874

(22) Filed: Jun. 13, 2019

(65) Prior Publication Data

US 2020/0145869 A1    May 7, 2020

Related U.S. Application Data

(60) Provisional application No. 62/754,905, filed on Nov. 2, 2018.

(51) Int. Cl.
| | |
|---|---|
| H04W 28/02 | (2009.01) |
| H04L 5/00 | (2006.01) |
| H04W 52/28 | (2009.01) |
| H04W 72/04 | (2009.01) |
| H04B 17/318 | (2015.01) |
| H04L 1/00 | (2006.01) |

(52) U.S. Cl.
CPC ...... *H04W 28/0215* (2013.01); *H04B 17/318* (2015.01); *H04L 1/0004* (2013.01); *H04L 5/0051* (2013.01); *H04W 52/28* (2013.01); *H04W 72/048* (2013.01)

(58) Field of Classification Search
None
See application file for complete search history.

(56) References Cited

U.S. PATENT DOCUMENTS

| | | | |
|---|---|---|---|
| 5,991,262 A | 11/1999 | Laird et al. | |
| 6,125,103 A | 9/2000 | Bäuml et al. | |
| 6,128,350 A | 10/2000 | Shastri et al. | |

(Continued)

FOREIGN PATENT DOCUMENTS

| | | |
|---|---|---|
| CN | 107046513 A | 8/2017 |
| EP | 2 264 937 A2 | 12/2010 |

(Continued)

OTHER PUBLICATIONS

Notice of Allowance received for U.S. Appl. No. 16/156,710 dated Jan. 15, 2020, 27 pages.

(Continued)

*Primary Examiner* — Saumit Shah
(74) *Attorney, Agent, or Firm* — Amin, Turocy & Watson, LLP

(57) ABSTRACT

Facilitating generation of demodulation reference signals in advanced networks (e.g., 4G, 5G, 6G, and beyond) is provided herein. Operations of a system can comprise evaluating a capability of a mobile device and generating a demodulation reference signal sequence for the mobile device based on the capability of the mobile device. The demodulation reference signal sequence can be a first type based on the capability being a first capability and can be a second type based on the capability being a second capability.

20 Claims, 12 Drawing Sheets

(56) References Cited

U.S. PATENT DOCUMENTS

| | | |
|---|---|---|
| 7,266,156 B2 | 9/2007 | Montojo et al. |
| 7,340,006 B2 | 3/2008 | Fun et al. |
| 7,418,041 B2 | 8/2008 | Jung et al. |
| 7,583,583 B2 | 9/2009 | Guo et al. |
| 7,839,947 B2 | 11/2010 | Clausen et al. |
| 8,135,081 B2 | 3/2012 | Moffatt et al. |
| 8,213,293 B2 | 7/2012 | Lee et al. |
| 8,358,711 B2 | 1/2013 | Marsili |
| 8,472,537 B2 | 6/2013 | Browning et al. |
| 8,571,000 B2 | 10/2013 | Zhou et al. |
| 8,774,258 B2 | 7/2014 | Tadano |
| 8,798,181 B1 | 8/2014 | Terry |
| 8,824,574 B2 | 9/2014 | Mccallister et al. |
| 9,363,736 B2 | 6/2016 | Griot et al. |
| 9,503,301 B2 | 11/2016 | Dick |
| 9,544,160 B2 | 1/2017 | Kim et al. |
| 9,577,779 B2 | 2/2017 | Vilaipornsawai et al. |
| 9,635,529 B2 | 4/2017 | Kruglick et al. |
| 9,641,373 B2 | 5/2017 | Zeng et al. |
| 9,848,410 B2 | 12/2017 | Ouchi et al. |
| 9,877,254 B2 | 1/2018 | Gholmieh et al. |
| 9,893,919 B2 | 2/2018 | Kim et al. |
| 10,051,654 B2 | 8/2018 | Tooher et al. |
| 10,897,766 B2* | 1/2021 | Parkvall .............. H04W 72/042 |
| 2002/0168016 A1 | 11/2002 | Wang et al. |
| 2007/0071120 A1 | 3/2007 | Talwar |
| 2010/0246527 A1 | 9/2010 | Montojo et al. |
| 2010/0272040 A1 | 10/2010 | Nam et al. |
| 2011/0038344 A1 | 2/2011 | Chmiel et al. |
| 2011/0075651 A1 | 3/2011 | Jia et al. |
| 2011/0228877 A1 | 9/2011 | Han et al. |
| 2011/0249767 A1 | 10/2011 | Chen et al. |
| 2012/0106610 A1 | 5/2012 | Nogami et al. |
| 2013/0077660 A1 | 3/2013 | Ko et al. |
| 2013/0114536 A1 | 5/2013 | Yoon |
| 2014/0016556 A1* | 1/2014 | Shimezawa .......... H04L 5/0048 |
| | | 370/328 |
| 2015/0163781 A1 | 6/2015 | Kim et al. |
| 2015/0304153 A1 | 10/2015 | Moffatt et al. |
| 2016/0173255 A1 | 6/2016 | Lee et al. |
| 2017/0237592 A1 | 8/2017 | Yang et al. |
| 2017/0310442 A1 | 10/2017 | Noh et al. |
| 2018/0026684 A1 | 1/2018 | Wei et al. |
| 2018/0115331 A1 | 4/2018 | Lange et al. |
| 2018/0123747 A1 | 5/2018 | Wang et al. |
| 2018/0131418 A1 | 5/2018 | Wang et al. |
| 2018/0131485 A1 | 5/2018 | Wang et al. |
| 2018/0198495 A1 | 7/2018 | Davydov |
| 2018/0198657 A1 | 7/2018 | Aiba et al. |
| 2018/0198668 A1 | 7/2018 | Kim et al. |
| 2018/0205586 A1 | 7/2018 | Park et al. |
| 2018/0234223 A1 | 8/2018 | Nakao et al. |
| 2018/0234277 A1 | 8/2018 | Akkarakaran et al. |
| 2018/0241603 A1 | 8/2018 | Jia et al. |
| 2018/0254867 A1 | 9/2018 | Kim et al. |
| 2018/0278396 A1 | 9/2018 | Yang et al. |
| 2018/0287680 A1 | 10/2018 | Xu et al. |
| 2018/0302905 A1 | 10/2018 | Fodor et al. |
| 2018/0316469 A1 | 11/2018 | Jiang et al. |
| 2018/0324005 A1 | 11/2018 | Kim et al. |
| 2018/0324787 A1 | 11/2018 | Yin et al. |
| 2019/0037376 A1 | 1/2019 | Liu et al. |
| 2019/0165913 A1 | 5/2019 | He et al. |
| 2019/0215119 A1 | 7/2019 | Kim et al. |
| 2019/0222457 A1* | 7/2019 | Wei ................... H04W 72/0446 |
| 2019/0320457 A1* | 10/2019 | Maaref ............. H04W 72/1289 |
| 2020/0014569 A1* | 1/2020 | Huang ................ H04J 13/0062 |
| 2020/0053660 A1* | 2/2020 | Ji ........................... H04L 5/0048 |
| 2020/0053670 A1* | 2/2020 | Jung ..................... H04W 56/00 |
| 2020/0068608 A1* | 2/2020 | Ye ....................... H04L 5/0044 |
| 2020/0112467 A1* | 4/2020 | Shen ..................... H04L 5/0044 |
| 2020/0120644 A1* | 4/2020 | Zhou ................... H04L 41/0806 |
| 2020/0177416 A1* | 6/2020 | Jiang .................... H04L 5/0091 |
| 2020/0178287 A1* | 6/2020 | Kim ........................ H04L 5/001 |
| 2020/0204335 A1 | 6/2020 | Kim et al. |
| 2022/0006579 A1* | 1/2022 | Wang .................. H04J 13/0062 |

FOREIGN PATENT DOCUMENTS

| | | |
|---|---|---|
| JP | 2015-070300 A | 4/2015 |
| WO | 2015/081107 A1 | 6/2015 |
| WO | 2016/174165 A2 | 11/2016 |
| WO | 2017/082232 A1 | 5/2017 |
| WO | 2017/121390 A1 | 7/2017 |
| WO | 2018/049035 A1 | 3/2018 |
| WO | 2018/060969 A1 | 4/2018 |

OTHER PUBLICATIONS

International Search Report and Written Opinion received for PCT Application Serial No. PCT/US2019/047584 dated Dec. 9, 2019, 42 pages.

Ericsson: "Benefits of resource specific DMRS mapping", URL: http://www.3gpp.org/ftp/Meetings%5F3GPP%5FSYNC/RAN1/Docs/, vol. No. Busan, May 20, 2018, 4 pages.

Ericsson: "On high PAPR in rank 2 transmissions with FDM of DMRS ports" URL:http://www.3gpp.org/ftp/Meetings%5F3GPP%5FSVNC/RAN1/Docs/vol. RAN WG1, No. Busan, Korea, May 20, 2018, 2 pages.

Ericsson: "On correlation of DMRS Gold sequences",URL:http://www.3gpp.org/ftp/Meetings%5F3GPP%5FSYNC/RAN1/Docs/vol. RAN WG1, No. Busan, Korea, May 20, 2018, 4 pages.

Non-Final Office Action received for U.S. Appl. No. 16/156,710 dated Jun. 10, 2019, 29 pages.

Lin et al., "5G New Radio: Unveiling the Essentials of the Next Generation Wireless Access Technology", arXiv preprint rXiv:1806.06898, 2018, pp. 1-8.

Ramos, Juan Sebastián Molano, "New Radio Interfaces Beyond 4G", URL: https://webthesis.biblio.polito.it/7611/1/tesi.pdf, Politecnico di Torino, 2018, pp. 1-53.

Guo, Jiabing, "Design and implementation of LTE-A and 5G kernel algorithms on SIMD vector processor", URL: http://www.diva-portal.org/smash/get/diva2:785081/FULL Texto 1.pdf, KTH Royal Institute of Technology, 2015, 83 pages.

Elsaadany et al., "Cellular LTE-A Technologies for the Future Internet-of-Things: Physical Layer Features and Challenges", URL: https://fardapaper.ir/mohavaha/uploads/2017/10/Cellular-LTE-ATechnologies.pdf, IEEE Communications Surveys & Tutorials, vol. 19, No. 4, 2017, 28 pages.

International Search Report and Written Opinion received for PCT Application Serial No. PCT/US2019/058984 dated Feb. 17, 2020, 13 pages.

Ericsson, "On specification-based solutions to the DMRS PAPR issue" URL:http://www.3gpp.org/ftp/tsg%5Fran/WG1%5FRL1/TSGR1%5F94b/Docs/R1%2D1811542%2Ezip, Sep. 29, 2018, 5 pages.

Final Office Action received for U.S. Appl. No. 16/156,710 dated Sep. 30, 2019, 11 pages.

Non-Final Office Action received for U.S. Appl. No. 16/144,646 dated Nov. 19, 2019, 33 pages.

Final Office Action received for U.S. Appl. No. 16/144,646 dated Jun. 12, 2020, 35 pages.

International Search Report and Written Opinion received for PCT Application Serial No. PCT/US2019/054810 dated Jan. 20, 2020, 15 pages.

Non-Final Office Action received for U.S. Appl. No. 16/847,825 dated Aug. 25, 2020, 31 pages.

International Preliminary Report on Patentability dated Apr. 22, 2021 for PCT/US2019/054810, 8 pages.

International Preliminary Report on Patentability dated May 14, 2021 for PCT/US2019/058984, 8 pages.

Notice of Allowance received for U.S. Appl. No. 16/847,825 dated Feb. 8, 2021, 25 pages.

Notice of Allowance received for U.S. Appl. No. 16/144,646 dated Mar. 22, 2021, 38 pages.

(56) References Cited

OTHER PUBLICATIONS

International Preliminary Report on Patentability dated Apr. 8, 2021 for PCT/US2019/047584, 11 pages.
Indian Office Action for Indian Application No. 202147019290 dated Feb. 15, 2022, 6 pages.
Notice of Reasons for Refusal for Japanese Application No. 2021-523864 dated Jun. 23, 2022.
AT&T, Analysis of PAPR Issue in NR, 3GPP TSG RAN WG1 #94b R1/1810683, <URL: http://3gpp.org/ftp/tsg_ran/WG1_RL1/TSGR1_94b/Dcos/R1-1811542.zip>, Sep. 29, 2018.

* cited by examiner

GENERATION OF DEMODULATION REFERENCE SIGNALS IN ADVANCED NETWORKS

CROSS-REFERENCE TO RELATED APPLICATIONS

This application claims the benefit of U.S. Provisional Application Ser. No. 62/754,905, filed Nov. 2, 2018, and entitled "GENERATION OF DEMODULATION REFERENCE SIGNALS IN ADVANCED NETWORKS," the entirety of which is expressly incorporated herein by reference.

TECHNICAL FIELD

This disclosure relates generally to the field of mobile communication and, more specifically, to reference signals in wireless communication systems for advanced networks (e.g., 4G, 5G, 6G, and beyond).

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) and/or Sixth Generation (6G) standard for wireless communications. Unique challenges exist to provide levels of service associated with forthcoming 5G, 6G, or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
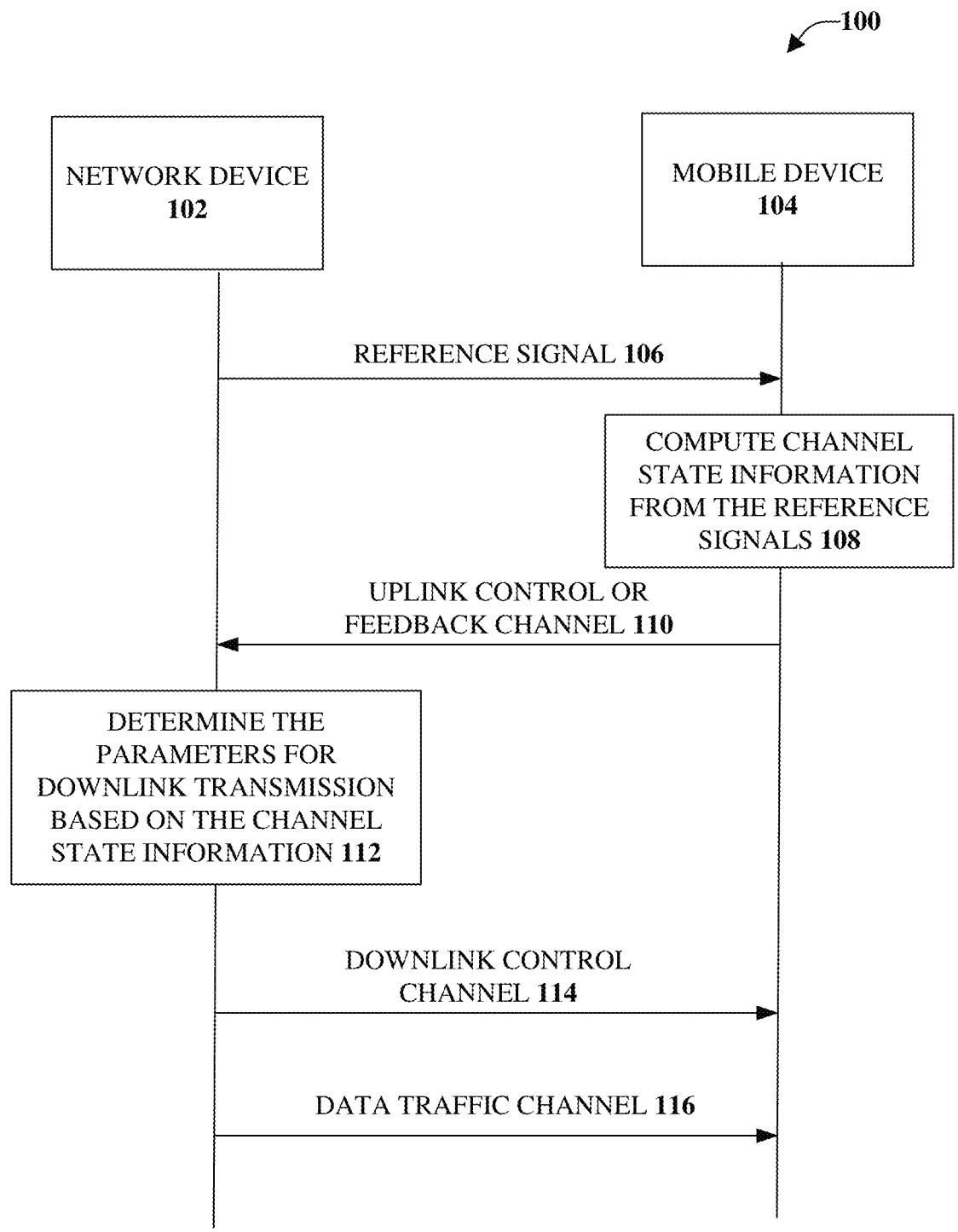
FIG. 1 illustrates an example, non-limiting, message sequence flow chart that can facilitate downlink data transfer in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, methods, articles of manufacture, and other embodiments or implementations that can facilitate generation of demodulation reference signals for advanced networks. More specifically described herein are aspects related to wireless communication systems and related to generating the reference signals in a multi antenna wireless communication system.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to LTE.

Multiple Input, Multiple Output (MIMO) systems can significantly increase the data carrying capacity of wireless systems. For these reasons, MIMO is an integral part of the third and fourth generation wireless systems (e.g., 3G and 4G). In addition, 5G systems also employ MIMO systems, which are referred to as massive MIMO systems (e.g., hundreds of antennas at the transmitter side (e.g., network) and/receiver side (e.g., user equipment). With a $(N_t, N_r)$ system, where $N_t$ denotes the number of transmit antennas and Nr denotes the number of receive antennas, the peak data rate multiplies with a factor of $N_t$ over single antenna systems in a rich scattering environment.

In one embodiment, described herein is a system that can comprise a processor and a memory that stores executable instructions that, when executed by the processor, facilitate performance of operations. The operations can comprise evaluating a capability of a mobile device and generating a demodulation reference signal sequence for the mobile device based on the capability of the mobile device. The demodulation reference signal sequence can be a first type based on the capability being a first capability and can be a second type based on the capability being a second capability.

According to some implementations, the operations can comprise prior to the evaluating the demodulation reference signal sequence, receiving, from the mobile device, an indication of the capability of the mobile device. Further to these implementations, receiving the indication of the capability can comprise receiving an information element in a transmitted signal. The information element can be set to a first value based on the capability being the first capability and set to a second value based on the capability being the second capability. Alternatively, receiving the indication of the capability can comprise receiving information related to whether the mobile device supports a low peak-to-average power ratio sequence as the first capability or does not support the low peak-to-average power ratio sequence as the second capability.

In some implementations, generating the demodulation reference signal sequence can comprise reducing a peak average power ratio in a communications network. According to some implementations, generating the demodulation reference signal sequence can comprise generating the demodulation reference signal sequence based on antenna ports used for demodulation reference signals. In some implementations, generating the demodulation reference signal sequence can comprise generating the demodulation reference signal sequence based on code division multiplexing groups used for demodulation reference signals.

In an example, the capability of the mobile device can be based on a software release version of the mobile device. The first capability can be related to the software release version being a first software release version and the second capability can be related to the software release version being a second software release version.

In some implementations, the demodulation reference signal sequence can be the second type. Further to these implementations, generating the demodulation reference signal sequence can comprise generating two sequences. Generation of the two sequences can comprise using a first bit for a first sequence of the two sequences of the demodulation reference signal sequence and using a second bit for a second sequence of the two sequences of the demodulation reference signal sequence.

Alternatively, or additionally, according to some implementations, the demodulation reference signal sequence can be the second type, and generating the demodulation reference signal sequence can comprise assigning a first scrambling identifier and a second scrambling identifier to the mobile device.

The operations can comprise facilitating a transmission of the demodulation reference signal sequence to the mobile device via higher layer radio resource control signaling.

According to some implementations, the first capability can represent that the mobile device supports an advanced wireless communication capability of a fifth generation wireless network protocol. Further, the second capability can represent that the mobile device does not support the advanced wireless communication capability of the fifth generation wireless network protocol.

Another embodiment relates to a method that can comprise obtaining, by a network device of a group of network devices, the network device comprising a processor, information related to a capability of a mobile device. The method can also comprise assigning, by the network device, a first scrambling identifier to the mobile device based on the capability of the mobile device being a first capability and a second scrambling identifier based on the capability of the mobile device being a second capability. Further, the method can comprise assigning, by the network device, a first scrambling identity information to the mobile device for a first code division multiplexing group and a second scrambling identity information to the mobile device for a second code division multiplexing group.

In accordance with some implementations, assigning the first scrambling identity information and the second scrambling identity information can be performed during scheduling of the mobile device.

The method can also comprise facilitating a transmission of the first scrambling identifier and the second scrambling identifier to the mobile device via higher layer radio resource control signaling.

In an example, assigning the first scrambling identity information and the second scrambling identity information can comprise determining the first code division multiplexing group and the second code division multiplexing group are different code division multiplexing groups.

In another example, obtaining the information related to the capability of the mobile device can comprise receiving information related to whether the mobile device supports a low peak-to-average power ratio sequence as the first capability or does not support the low peak-to-average power ratio sequence as the second capability. Further to this example, assigning the first scrambling identity information and the second scrambling identity information can comprise reducing a peak average power ratio in a communications network.

A further embodiment relates to a machine-readable storage medium, comprising executable instructions that, when executed by a processor of a mobile device, facilitate performance of operations. The operations can comprise generating a demodulation reference signal sequence based on information received from a network device of a group of network devices. The demodulation reference signal sequence can be a first type based on a capability of a mobile device being determined to comprise a first capability and a second type based on the capability of the mobile device being determined to comprise a second capability other than the first capability. The operations can also comprise decoding a physical downlink shared channel based on a channel estimate determined as a function of the demodulation reference signal sequence.

In some implementations, the operations can comprise, prior to generating the demodulation reference signal sequence, obtaining information related to a scrambling identity information. Downlink control information can comprise the scrambling identity information.

According to some implementations, generating the demodulation reference signal sequence can comprise generating respective demodulation reference signal sequences for antenna ports of a group of antenna ports.

Referring initially to FIG. 1, illustrated is an example, non-limiting, message sequence flow chart 100 that can facilitate downlink data transfer in accordance with one or more embodiments described herein. The message sequence flow chart 100 can be utilized for new radio, as discussed herein. As illustrated, the message sequence flow chart 100 represents the message sequence between a network device 102 (e.g., a gNB) and a mobile device 104. As used herein, the term "network device 102" can be interchangeable with (or can include) a network, a network controller or any number of other network components. One or more pilot signals and/or reference signals 106 can be transmitted from the network device 102 to the mobile device 104. The one or more pilot signals and/or reference signals 106 can be cell specific and/or user equipment specific signals. The one or more pilot signals and/or reference signals 106 can be beamformed or non-beamformed.

Based on the one or more pilot signals and/or reference signals 106, the mobile device 104 can compute the channel estimates and can compute the one or more parameters needed for Channel State Information (CSI) reporting, as indicated at 108. The CSI report can comprise, for example, Channel Quality Indicator (CQI), Precoding Matrix Index (PMI), Rank Information (RI), Channel State Information Reference Signal (CSI-RS) Resource Indicator (CRI the same as beam indicator), and so on, or any number of other types of information.

The CSI report can be sent from the mobile device 104 to the network device 102 via a feedback channel (e.g., an uplink control or feedback channel 110). The CSI report can be sent based on a request from the network device 102, a-periodically, and/or the mobile device 104 can be configured to report periodically or at another interval.

The network device 102, which can comprise a scheduler (e.g., a scheduler component), can use the CSI report for choosing the parameters for scheduling of the mobile device 104 (e.g., a particular mobile device). For example, as indicated at 112, the network device 102 can choose the parameters for downlink transmission based on the channel state information. The parameters for downlink transmission can include, but are not limited to: Modulation and Coding Scheme (MCS), power, Physical Resource Blocks (PRBs), and so on.

The network device 102 can send the scheduling parameters to the mobile device 104 via a downlink control channel (e.g., a downlink control channel 114). Upon or after the scheduling parameter information is transmitted, the actual data transfer can take place from the network device 102 to the mobile device 104 over a data traffic channel (e.g., data traffic channel 116).

Downlink reference signals are predefined signals occupying specific resource elements within the downlink time-frequency grid. There are several types of downlink reference signals that are transmitted in different ways and used for different purposes by the receiving terminal (e.g., the mobile device 104). For example, downlink reference signals can include CSI reference signals (CSI-RS) and/or demodulation reference signals (DM-RS).

CSI reference signals are specifically intended to be used by terminals (e.g., the mobile device 104) to acquire channel-state information (CSI) and beam specific information (beam RSRP). In 5G, for example, CSI-RS is mobile device specific. Therefore, the CSI-RS can have a significantly lower time/frequency density.

Demodulation reference signals (also sometimes referred to as User Equipment (UE)-specific reference signals), are specifically intended to be used by terminals for channel estimation for the data channel. The label "UE-specific" relates to the fact that each demodulation reference signal is intended for channel estimation by a single terminal. That specific reference signal is then only transmitted within the resource blocks assigned for data traffic channel transmission to that terminal.

Other than the above-mentioned reference signals, there are other reference signals, namely phase tracking and tracking and sounding reference signals, which can be used for various purposes.

An uplink control channel carries information about Hybrid Automatic Repeat Request (HARQ-ACK) information corresponding to the downlink data transmission, and channel state information. The channel state information can comprise CSI-RS Resource Indicator (CRI), Rank Indicator (RI), Channel Quality Indicator (CQI), Precoding Matrix Indicator (PMI), Layer Indicator, and so on. The CSI can be divided into at least two categories. For example, a first category can be for subband and a second category can be for wideband. The configuration of subband and/or wideband CSI reporting can be performed through Radio Resource Control (RRC) signaling as part of CSI reporting configuration. Table 1 below illustrates example contents of an example CSI report for both wideband and subband. Specifically, Table 1 illustrates the contents of a report for PMI format indicator=Wideband, CQI format indicator=wideband and for PMI format indicator=subband, CQI format indicator=subband.

TABLE 1

| PMI-FormatIndicator = widebandPMI and | PMI-FormatIndicator = subbandPMI or CQI-FormatIndicator = subbandCQI | | |
|---|---|---|---|
| CQI-FormatIndicator = | | CSI Part II | |
| widebandCQI | CSI Part I | wideband | Subband |
| CRI | CRI | Wideband CQI for the second TB | Subband differential CQI for the second TB of all even subbands |
| Rank Indicator | Rank Indicator | PMI wideband (X1 and X2) | PMI subband information fields $X_2$ of all even subbands |
| Layer Indicator | Layer Indicator | - - - | Subband differential CQI for the second TB of all odd subbands |
| PMI wideband (X1 and X2) | Wideband CQI | - - - | PMI subband information fields $X_2$ of all odd subbands |
| Wideband CQI | Subband differential CQI for the first TB | - - - | - - - |

It is noted that for NR, the subband can be defined according to the bandwidth part of the OFDM in terms of PRBs as shown in Table 2 below, which illustrates example, non-limiting, configurable subband sizes. The subband configuration can also be performed through RRC signaling.

TABLE 2

| Carrier bandwidth part (PRBs) | Subband Size (PRBs) |
|---|---|
| <24 | N/A |
| 24-72 | 4, 8 |
| 73-144 | 8, 16 |
| 145-275 | 16, 32 |

The downlink control channel (PDCCH) can carry information about the scheduling grants. This can comprise a number of MIMO layers scheduled, transport block sizes, modulation for each codeword, parameters related to HARQ, subband locations, and so on. It is noted that all Downlink Control Information (DCI) formats might not use and/or might not transmit all the information as shown above. In general, the contents of PDCCH depends on transmission mode and DCI format.

In some cases, the following information can be transmitted by means of the downlink control information (DCI) format: carrier indicator, identifier for DCI formats, bandwidth part indicator, frequency domain resource assignment, time domain resource assignment, Virtual Resource Block (VRB)-to-PRB mapping flag, PRB bundling size indicator, rate matching indicator, Zero Power (ZP) CSI-RS trigger, modulation and coding scheme for each Transport Block (TB), new data indicator for each TB, redundancy version for each TB, HARQ process number, downlink assignment index, Transmit Power Control (TPC) command for uplink control channel, Physical Uplink Control Channel (PUCCH) resource indicator, Physical Downlink Shared Channel (PDSCH)-to-HARQ feedback timing indicator, antenna port(s), transmission configuration indication, Sounding Reference Signal (SRS) request, Code Block Group (CBG) transmission information, CBG flushing out information, Demodulation Reference Signal (DMRS) sequence initialization, and so on.

Figure 2:
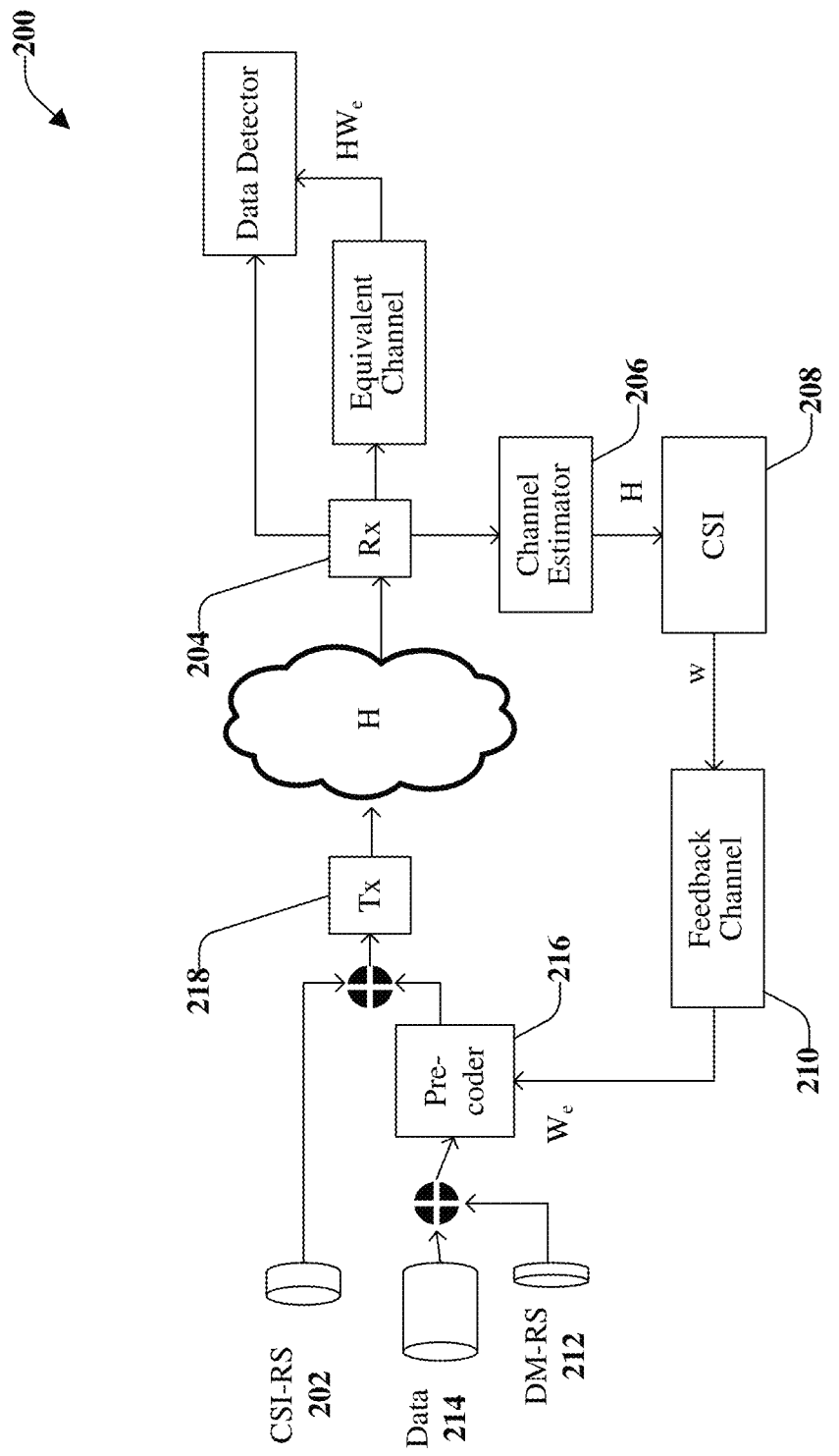
FIG. 2 illustrates an example, non-limiting, system diagram of a Multiple Input Multiple Output (MIMO) system with Demodulation Reference Signals (DM-RS) in accordance with one or more embodiments described herein.

FIG. 2 illustrates an example, non-limiting, system diagram 200 of a Multiple Input Multiple Output (MIMO) system with Demodulation Reference Signals (DM-RS) in accordance with one or more embodiments described herein. MIMO systems can significantly increase the data carrying capacity of wireless systems. MIMO can be used for achieving diversity gain, spatial multiplexing gain, and beamforming gain. For these reasons, MIMO is an integral part of 3G and 4G wireless systems. In addition, massive MIMO systems are currently under investigation for 5G systems and more advanced systems.

The system diagram 200 is an example, non-limiting conceptual diagram of a MIMO system with demodulation reference signal. At a gNode B transmitter, common reference signals, namely CSI-RS 202 are transmitted for channel sounding. The UE receiver 204 estimates channel quality (typically SINR) from channel sounding (e.g., via a channel estimator device 206), and computes the preferred precoding matrix (PMI), rank indicator (RI), and CQI for the next downlink transmission. This information is referred to as channel state information (CSI) 208. The UE conveys this information through a feedback channel 210 (e.g., the uplink control or feedback channel 110 as discussed with respect to FIG. 1).

For downlink data transmission, the gNode B uses this information and chooses the precoding matrix as suggested by the UE (or the gNodeB can choose a precoding matrix on its own, which can be other than the UE recommended PMI), CQI, and the transport block size, and so on. Finally, both the reference signal (DM-RS) 212 and the data 214 are multiplied by the precoding matrix (e.g., pre-coder device 216) selected by the gNode B and transmitted, indicated at 218. The UE receiver estimates the effective channel (e.g., the channel multiplied by the precoding matrix) and demodulates the data.

Figure 3A:
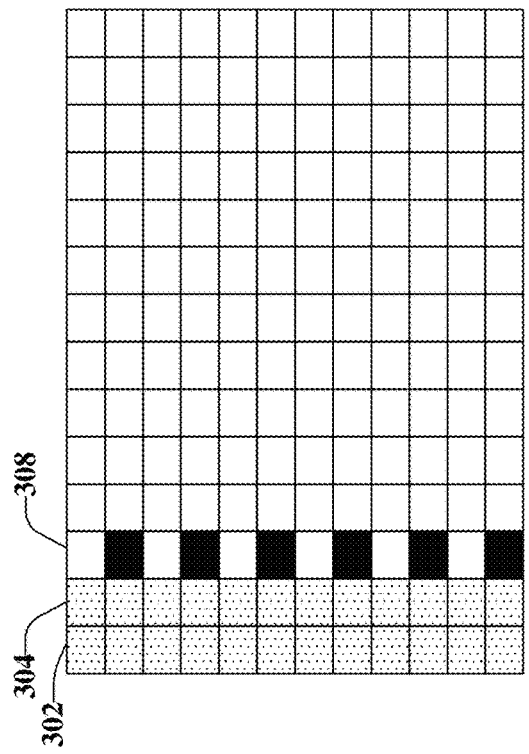
FIG. 3A illustrates resource mapping for antenna port 0 in accordance with one or more embodiments described herein.
Figure 3B:
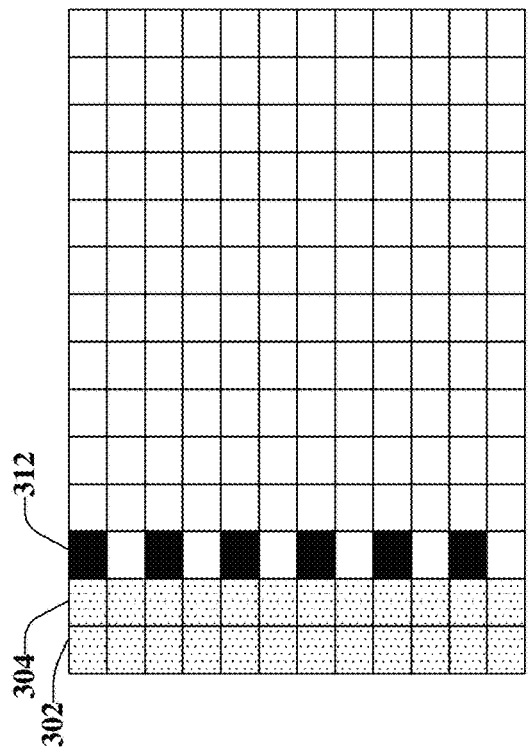
FIG. 3B illustrates resource mapping for antenna port 1 in accordance with one or more embodiments described herein.
Figure 3C:
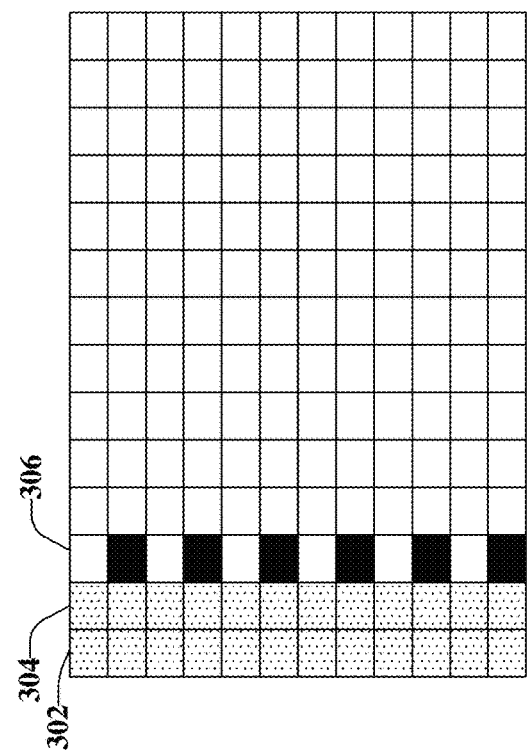
FIG. 3C illustrates resource mapping for antenna port 2 in accordance with one or more embodiments described herein.
Figure 3D:
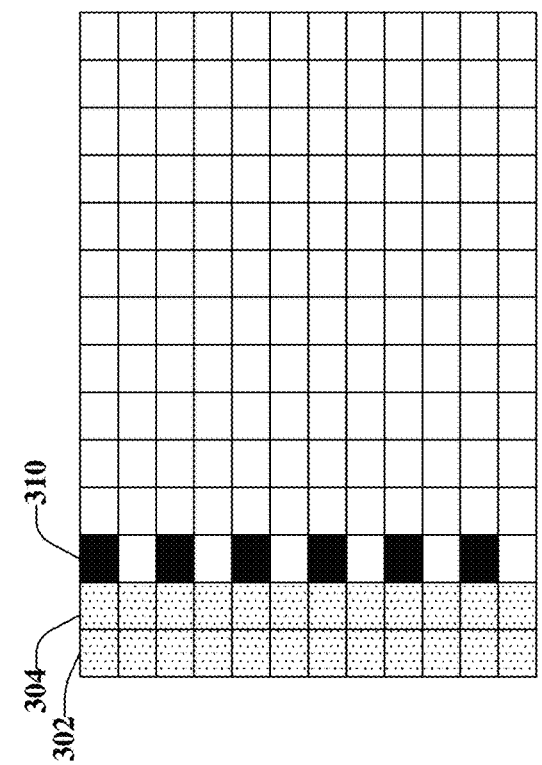
FIG. 3D illustrates resource mapping for antenna port 3 in accordance with one or more embodiments described herein.

FIGS. 3A to 3D illustrate non-limiting examples of resource mapping for a Demodulation Reference Signal (DM-RS) structure for up to four antenna ports in accordance with one or more embodiments described herein. Specifically, FIG. 3A illustrates resource mapping for antenna port 0; FIG. 3B illustrates resource mapping for antenna port 1; FIG. 3C illustrates resource mapping for antenna port 2; and FIG. 3D illustrates resource mapping for antenna port 3.

As indicated, FIGS. 3A to 3D illustrate an example of DM-RS structure for four antenna ports (hence maximum four layers and four DM-RS) in a NR system. The first two OFDM symbols in FIGS. 3A-3D are control symbols (indicated by columns 302 and 304).

As illustrated in FIG. 3A, six reference symbols, indicated as the dark squares in the third OFDM symbol (e.g., indicated as third column 306) within a resource-block are transmitted for a single antenna port 0. As illustrated in FIG. 3B, the same reference symbols, indicated as the dark squares in the third OFDM symbol (indicated as the third column 308), are code multiplexed and transmitted on antenna port 1.

In a similar manner, for port 2 (FIG. 3C) and port 3 (FIG. 3D) the same resource elements are used for transmitting DMRS reference symbols. These are illustrated by the dark squares in the third column 310 of FIG. 3C and the third column 312 of FIG. 3D. However, they are code multiplexed as in port 0 (FIG. 3A) and port 1 (FIG. 3B). Note that the resource elements are used for ranks 3 and 4 (ports 2 and 3) are orthogonal in frequency to that of port 0 and port 1. The other reference symbols in FIGS. 3A to 3D can be utilized for data.

As the number of transmitted layers can vary dynamically, the number of transmitted DM-RS can also vary. The terminal (e.g., the mobile device 104, the UE) can be informed about the number of transmitted layers (or the rank) as part of the scheduling information via downlink control channel as explained with respect to FIG. 1.

Similar to LTE, in NR the OFDM waveform can be used for both downlink and uplink transmissions. The transmit signals in an OFDM system can have high peak values in the time domain since many subcarrier components are added via an Inverse Fast Fourier Transform (IFFT) operation. Therefore, OFDM systems are known to have a high Peak-to-Average Power Ratio (PAPR), compared with single-carrier systems. In fact, the high PAPR is one of the most detrimental aspects in the OFDM system, as it decreases the Signal-to-Quantization Noise Ratio (SQNR) of Analog-to-Digital Converter (ADC) and Digital-to Analog Converter (DAC) while degrading the efficiency of the power amplifier in the transmitter.

Figure 4:
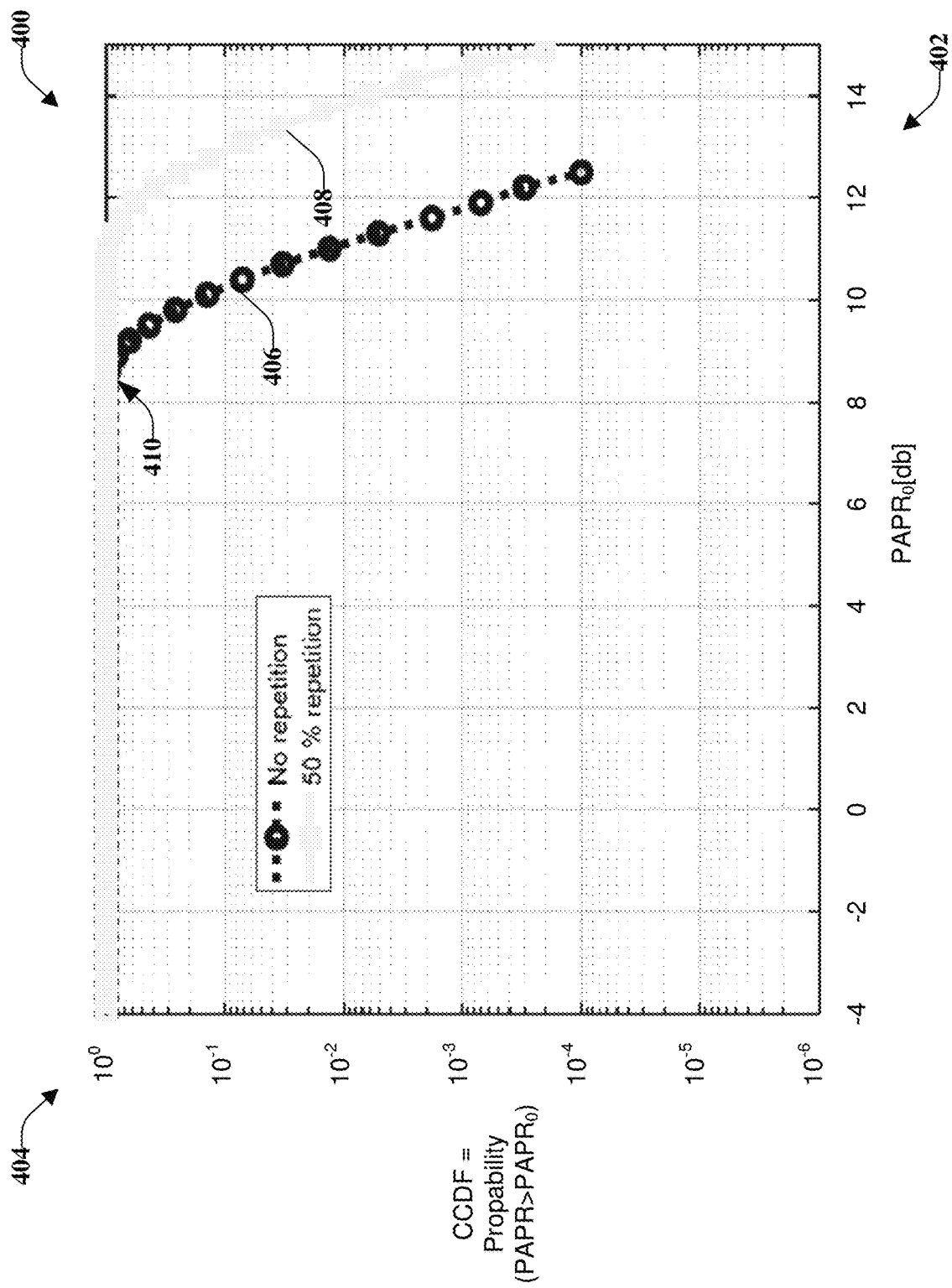
FIG. 4 illustrates an example graphic representation of peak-to-average power ratio with repetition of symbols for rank 1 in accordance with one or more embodiments described herein.

FIG. 4 illustrates an example graphic representation 400 of peak-to-average power ratio with repetition of symbols for rank 1 in accordance with one or more embodiments described herein. Illustrated on the horizontal axis 402 is $PAPR_0$, in decibels (dB). Illustrated on the vertical axis 404 is Complementary Cumulative Distribution Function (CCDF) in probability (PAPR>$PAPR_0$). Inputs for the graphic representation 400 comprise around 4,096 inputs (n inputs), Rayleigh input, rank 1. No repetition is indicated by line 406 and fifty percent (50%) repetition is indicated by line 408. As illustrated, the lines (line 406 and line 408) overlap until the point indicated at 410.

Figure 5:
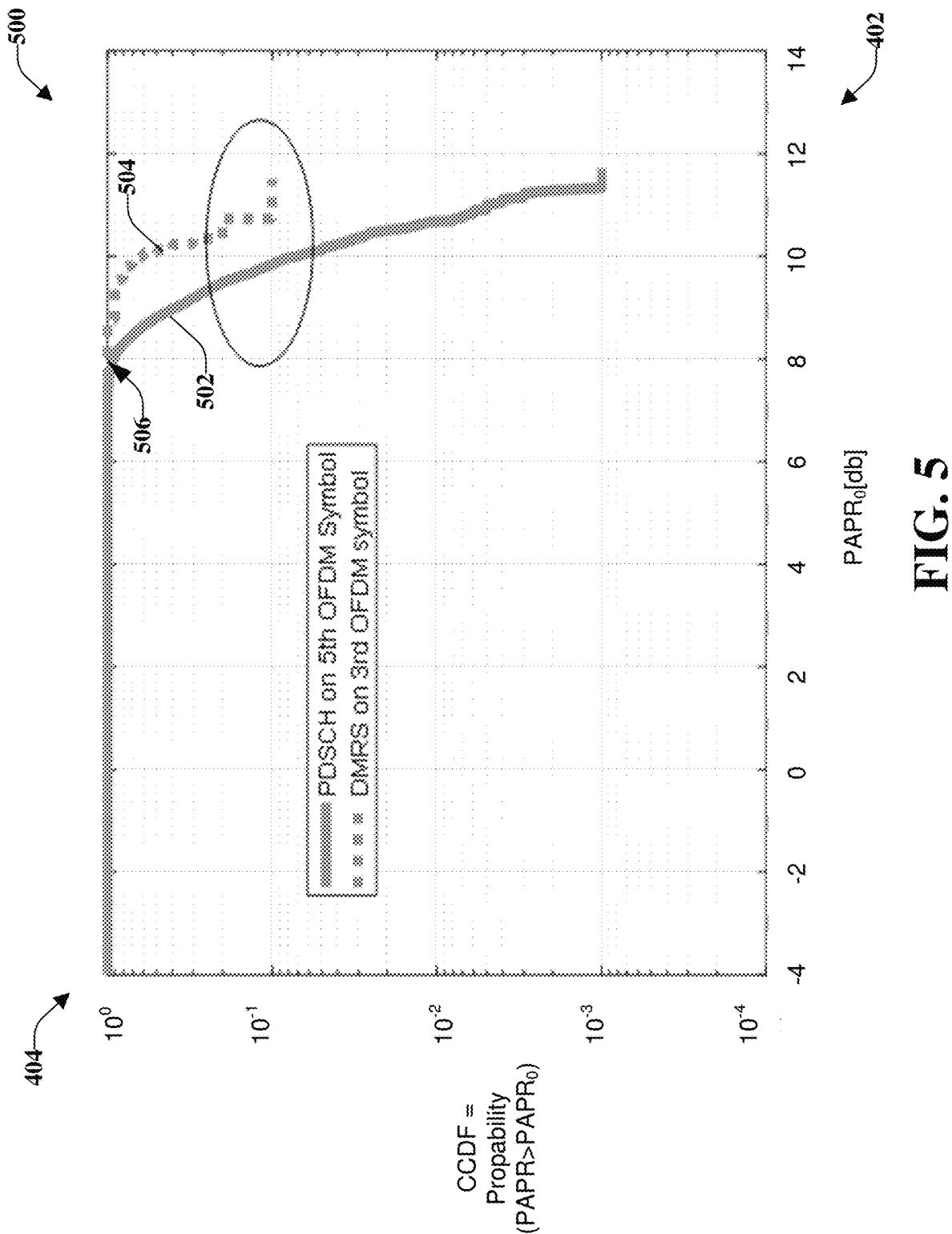
FIG. 5 illustrates an example graphic representation of peak-to-average power ratio with repetition of symbols for rank 3 in accordance with one or more embodiments described herein.

FIG. 5 illustrates an example graphic representation 500 of peak-to-average power ratio with repetition of symbols for rank 3 in accordance with one or more embodiments described herein. Repetitive description of like elements employed in other embodiments described herein is omitted for sake of brevity.

Illustrated on the horizontal axis 402 is $PAPR_0$, in decibels (dB). Illustrated on the vertical axis 404 is CCDF in probability (PAPR>$PAPR_0$). PDSCH on the fifth OFDM symbol is indicated by line 502 and DMRS on the third OFDM symbol is indicated by line 504. As illustrated, the lines (line 502 and line 504) overlap until the point indicated at 506.

Figure 6:
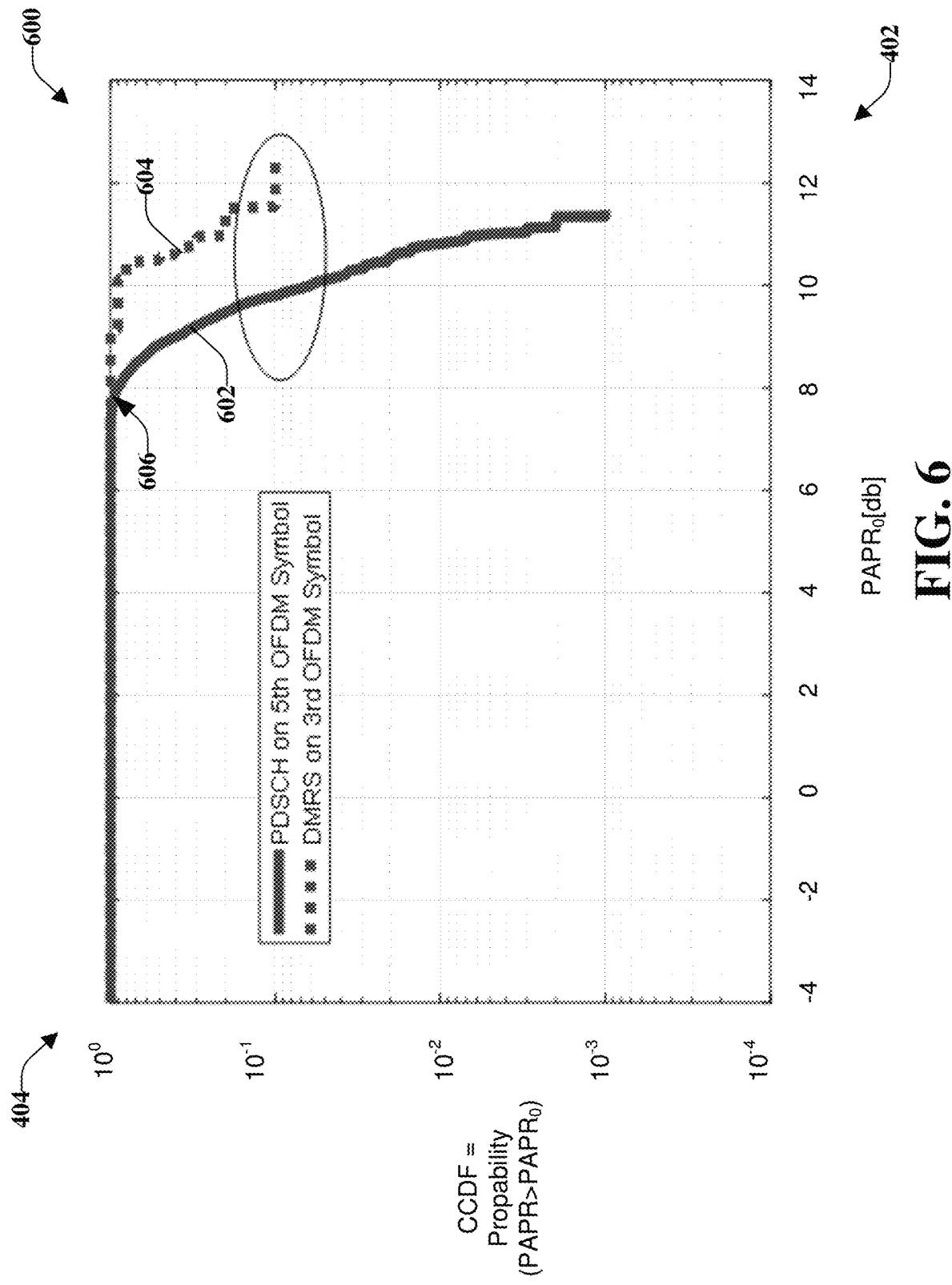
FIG. 6 illustrates an example graphic representation of peak-to-average power ratio with repetition of symbols for rank 4 in accordance with one or more embodiments described herein.

FIG. 6 illustrates an example graphic representation 600 of peak-to-average power ratio with repetition of symbols for rank 4 in accordance with one or more embodiments described herein. Repetitive description of like elements employed in other embodiments described herein is omitted for sake of brevity.

Illustrated on the horizontal axis 402 is PAPR$_0$, in decibels (dB). Illustrated on the vertical axis 404 is CCDF in probability (PAPR>PAPR$_0$). PDSCH on the fifth OFDM symbol is indicated by line 602 and DMRS on the third OFDM symbol is indicate by line 604. As illustrated, the lines (line 602 and line 604) overlap until the point indicated at 606.

As can be determined from the NR design for DMRS the symbols are repeated for ports 2 and 3. However, when the symbols are repeated, the PAPR increases as shown in FIGS. 4-6.

Since there is an increase in PAPR due to DMRS repetition, this results in operating the saturation region of the power amplifier. Further, this results in out of band emissions and the system cannot be operated in accordance with the specification limits. A solution to mitigate this issue is the use of power back off. That is, the power amplifier needs to be back off by a few dB s for NR operation. With power back off, the coverage is reduced while at the same time the power amplifier efficiency is reduced. Another solution to reduce the PAPR is to use clipping, where the peaks are limited. However, with clipping the transmitted Error Vector Magnitude (EVM) is increased and the transmitted signal is distorted, which results in reduced throughput especially for higher order modulation schemes such as 64 Quadrature Amplitude Modulation (QAM), and 256 QAM. In contrast, the disclosed aspects can provide an efficient solution to reduce the PAPR in the base band.

Various aspects discussed herein relate to reducing the PAPR in NR systems. For example, the DMRS sequence generation can be modified such that its sequence generation depends on the antenna port or the Code Division Multiplexing (CDM) group used for DMRS. Since individual sequences are used for each antenna port and/or CDM group, the PAPR can be reduced and can be equal to that of data. According to some implementations, the network (e.g., a network device) can generate the DMRS sequence based on the UE capability. That is, as an example, the network (e.g., the network device) can use a first sequence if the UE is a Release 15 UE or can generate a second sequence, different from the first sequence, if the UE is a Release 16 capable UE. Although discussed with respect to a release (e.g., a software release), the disclosed aspects are not limited to this example and other parameters can be utilized for the capability of the UE.

The disclosed aspects provide various advantages. For example, with the disclosed aspects, the NR can schedule transmission ranks greater than 2 without using power back off of the amplifier. This in turn can increase the link and system throughput of the 5G system, which can provide huge gains as compared to other (conventional) techniques to reduce the PAPR.

In some embodiments the non-limiting term user equipment (UE) is used and refers to any type of wireless device communicating with a radio network node in a cellular or mobile communication system. Examples of a UE are: target device, device to device (D2D) UE, machine type UE or UE capable of machine to machine (M2M) communication, PDA, iPad, tablet, mobile terminals, smart phone, Laptop Embedded Equipped (LEE), Laptop Mounted Equipment (LME), USB dongles, and so forth.

It is noted that only a 4×4 MIMO system is considered for describing the disclosed aspects. However, the various aspects are equally applicable for 8 TX, and in general for any Nt≥2 Tx system whereby PMI and RI estimation is required. This disclosure interchangeably defines PMI as an index within a codebook or the PMI as a precoder itself, depending on the context.

The embodiments are described in particular for closed-loop MIMO transmission scheme in NR, LTE based systems. However, the embodiments are applicable to any Radio Access Technology (RAT) or multi-RAT system where the UE operates using closed-loop MIMO (e.g., HSDPA, Wi-Fi/WLAN, WiMax, CDMA 2000, and so on).

The embodiments are applicable to single carrier as well as to multicarrier (MC) or carrier aggregation (CA) operation of the UE in conjunction with MIMO in which the UE is able to receive and/or transmit data to more than one serving cell using MIMO. The term carrier aggregation (CA) is also called (e.g., interchangeably called) "multi-carrier system," "multi-cell operation," "multi-carrier operation," "multi-carrier" transmission and/or reception.

According to some implementations, a random sequence can be generated. The random sequence can be dependent on the CDM groups used for DMRS transmission thereby avoiding the repetition for ports 2 and 3. This in turn can reduce the PAPR problem for NR.

A method to generate the sequence for DMRS will now be explained. The UE can assume the sequence r(n) is defined by:

$$r(n) = \frac{1}{\sqrt{2}}(1 - 2 \cdot c(2n)) + j\frac{1}{\sqrt{2}}(1 - 2 \cdot c(2n + 1)).$$

where the pseudo-random sequence c(i) is defined as:

$c(n)=(x_1(n+N_c)+x_2(n+N_c))\bmod 2$ $x_1(n+31)=(x_1(n+3)+x_1(n))\bmod 2$ $x_2(n+31)=(x_2(n+3)+x_2(n+2)+x_2(n+1)+x_2(n))\bmod 2$ where $N_c=1600$ and the first m-sequence (n) can be initialized with $x_1(0)=1, x_1(n)=0, n=1,2,\ldots,30$. The initialization of the second m-sequence, $x_2(n)$, is denoted by $c_{init} \Sigma_{i=0}^{30} x_2(i) \cdot 2^i$ with the value depending on the application of the sequence.

The pseudo-random sequence generator can be initialized with:

$c_{init}=(2^{17}(N_{symb}^{slot}n_{s,f}^\mu+l+1)(2N_{ID}^{nSCID}+1)+ 2N_{ID}^{nSCID}+n_{SCID})\bmod 2^{31}$ where l is the OFDM symbol number within the slot, $n_{s,f}^\mu$ is the slot number within a frame, and $N_{ID}^0, N_{ID}^1 \in \{0,1,\ldots,65535\}$ are given by the higher-layer parameters scramblingID0 and scramblingID1, respectively, in the DMRS-DownlinkConfig IE if provided and the PDSCH is scheduled by PDCCH using DCI format 1_1 with the CRC scrambled by C-RNTI, MCS-C-RNTI, or CS-RNTI $N_{ID}^0 \in \{0,1,\ldots,65535\}$ is given by the higher-layer parameter scramblingID0 in the DMRS-DownlinkConfig IE if provided and the PDSCH is scheduled by PDCCH using DCI format 1_0 with the CRC scrambled by C-RNTI, MCS-C-RNTI, or CS-RNTI;

$N_{ID}^{nSCID}=N_{ID}^{cell}$ otherwise;

The quantity $n_{SCID} \in \{0, 1\}$ is given by the DM-RS sequence initialization field in the DCI associated with the PDSCH transmission if DCI format 1_1 in [4, TS 38.212] is used, otherwise $n_{SCID}=0$.

It can be observed that two separate sequences can be generated if $n_{SCID}$, is changed. Therefore, a first sequence can be generated with $n_{SCID}=0$ and a second sequence can be generated with $n_{SCID}=1$. Therefore, according to various implementations, two fields can be used in the downlink control channel with sequence initialization set to two different values if the CDM groups are different.

Figure 7:
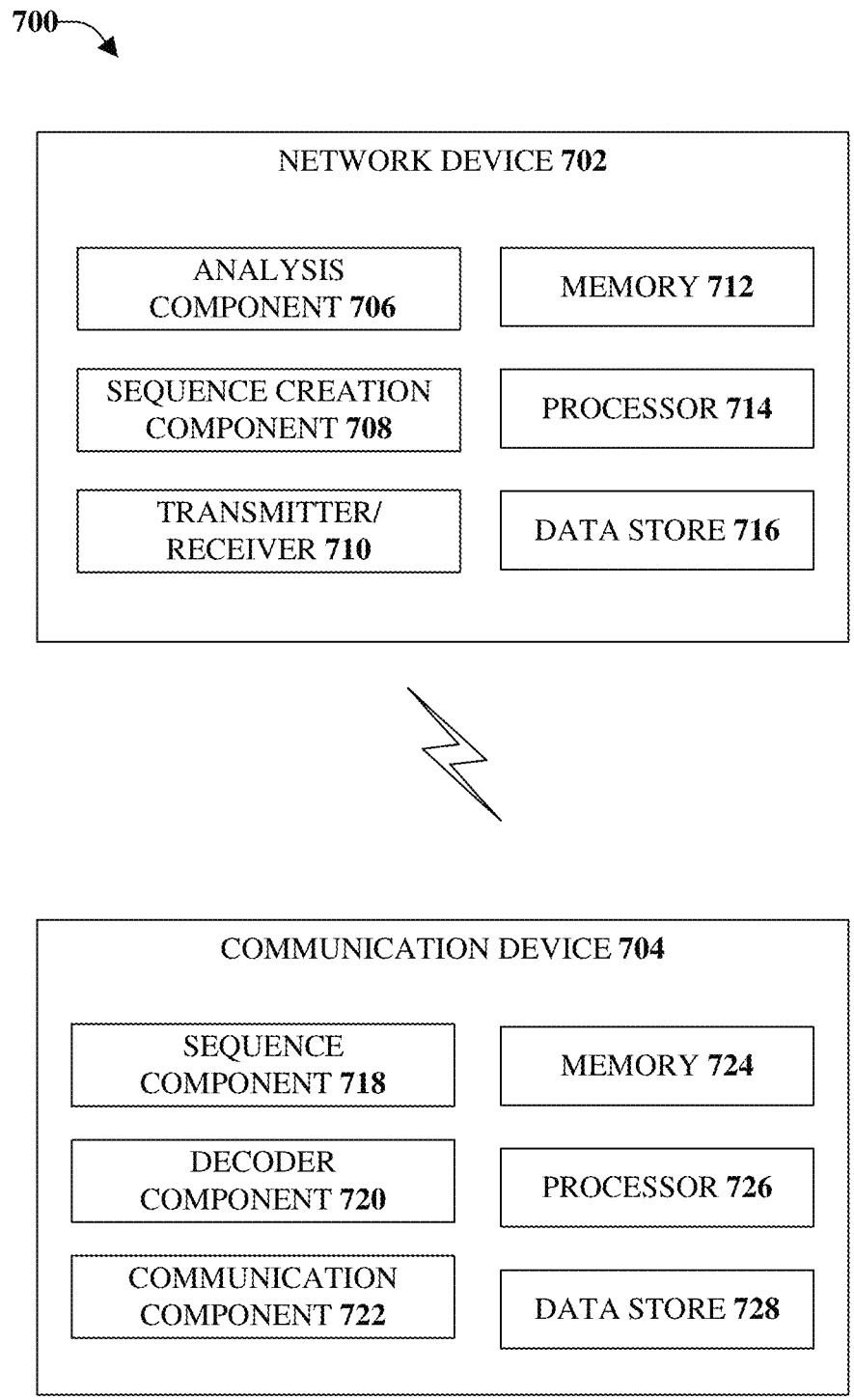
FIG. 7 illustrates an example, non-limiting, system for facilitating generation of demodulation reference signals in advanced networks in accordance with one or more embodiments described herein.

FIG. 7 illustrates an example, non-limiting, system 700 for facilitating generation of demodulation reference signals in advanced networks in accordance with one or more embodiments described herein. As illustrated in FIG. 7, the system 700 can include a network device 702 and a communication device 704 (e.g., a user equipment device, a mobile device, and so on). The network device 702 can be included in a group of network devices of a wireless network. Although only a single network device and a single communication device are shown and described, the various aspects are not limited to this implementation. Instead, multiple communication devices and/or multiple network devices can be included in a communications system.

The network device 702 can include an analysis component 706, a sequence creation component 708, a transmitter/receiver component 710, at least one memory 712, at least one processor 714, and at least one data store 716. The communication device 704 can include a sequence component 718, a decoder component 720, a communication component 722, at least one memory 724, at least one processor 726, and at least one data store 728.

The analysis component 706 can be configured to evaluate a capacity of the communication device 704. For example, the communication device 704 (e.g., via the communication component 722) can transmit an indicate of its capacity. The indication of the capacity of the communication device 704 can be received at the network device 702 via the transmitter/receiver component 710.

According to some implementations, the indication of the capacity can be received at the network device 702 as an information element in a transmitted signal (e.g., from the communication device 704). The information element can be set to a first value based on the capability being a first capability and can be set to a second value based on the capability being a second capability.

In accordance with some implementations, the indication of the capacity can be received at the network device 702 as information related to whether the communication device 704 supports a low peak-to-average power ratio sequence as the first capability or does not support the low peak-to-average power ratio sequence as the second capability.

According to some implementations, the capability of the communication device 704 can be based on a software release version of the communication device 704. For example, the first capability can be related to the software release version being a first software release version and the second capability can be related to the software release version being a second software release version.

In accordance with some implementations, the first capability can represent that the communication device 704 supports an advanced wireless communication capability of a fifth generation wireless network protocol. Further to these implementations, the second capability can represent that the communication device 704 does not support the advanced wireless communication capability of the fifth generation wireless network protocol.

The sequence creation component 708 can be configured to generate a demodulation reference signal sequence for the communication device 704 based on the capability of the communication device 704. For example, the demodulation reference signal sequence can be a first type based on the capability being a first capability and a second type based on the capability being a second capability. Based on the generation of the demodulation reference signal sequence, a peak average power ratio in a communications network can be reduced.

In an example, the demodulation reference signal sequence can be generated by the sequence creation component 708 based on antenna ports used for demodulation reference signals. In another example, the demodulation reference signal sequence can be generated by the sequence creation component 708 based on code division multiplexing groups used for demodulation reference signals.

In the situation where the demodulation reference signal sequence is the second type, the sequence creation component 708 can generate two sequences. To generate the two sequences, the sequence creation component 708 can use a first bit for a first sequence of the two sequences of the demodulation reference signal sequence. Further, the sequence creation component 708 can use a second bit for a second sequence of the two sequences of the demodulation reference signal sequence.

Alternatively, in the situation where the demodulation reference signal sequence is the second type, the sequence creation component 708 can generate the demodulation reference signal sequence by assigning a first scrambling identifier and a second scrambling identifier to the communication device 704.

The transmitter/receiver component 710 can transmit the demodulation reference signal sequence to the communication device 704 via higher layer radio resource control signaling. Upon or after receipt of the reference signal sequence (e.g., via the communication component 722), the sequence component 718 can generate a demodulation reference signal sequence based on the information received from the network device 702. In an example, generating the demodulation reference signal sequence can comprise generating respective demodulation reference signal sequences for antenna ports of a group of antenna ports.

Further, the decoder component 720 can decode a physical downlink shared channel based on a channel estimate determined as a function of the demodulation reference signal sequence. In some implementations, prior to generating the demodulation reference signal sequence, the communication device 704 can obtain information related to a scrambling identity information. For example, downlink control information can comprise the scrambling identity information.

The transmitter/receiver component 710 (and/or the communication component 722) can be configured to transmit to (and/or receive data from) the communication device 704 (or the network device 702), other network devices, and/or other communication devices. Through the transmitter/receiver component 710 (and/or the communication component 722), the network device 702 (and/or the communication device 704) can concurrently transmit and receive data, can transmit and receive data at different times, or combinations thereof. According to some implementations, the communication component 722 can be configured to receive, from the network device 702 or other network devices, multimedia content.

The at least one memory 712 can be operatively connected to the at least one processor 714. Further, the at least one memory 724 can be operatively connected to the at least one processor 726. The memories (e.g., the at least one memory 712, the at least one memory 724) can store executable instructions that, when executed by the processors (e.g., the at least one processor 714, the at least one processor 726) can facilitate performance of operations. Further, the processors can be utilized to execute computer executable components stored in the memories.

For example, the memories can store protocols associated with demodulation reference signal sequences as discussed herein. Further, the memories can facilitate action to control communication between the communication device 704 and the network device 702 such that the system 700 can employ stored protocols and/or algorithms to achieve improved communications in a wireless network as described herein.

The memories can store respective protocols associated with generation of demodulation reference signals in advanced networks, taking action to control communication between the communication device 704 and the network device 702, such that the system 700 can employ stored protocols and/or algorithms to achieve improved communications in a wireless network as described herein. It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The processors can facilitate respective analysis of information related to generation of demodulation reference signals in a communication network. The processors can be processors dedicated to analyzing and/or generating information received, a processor that controls one or more components of the system 700, and/or a processor that both analyzes and generates information received and controls one or more components of the system 700.

Further, the term network device (e.g., network node, network node device, radio network node, and so on) is used herein to refer to any type of network node serving communication devices and/or connected to other network nodes, network elements, or another network node, or any radio node from where the communication device can receive a signal. In cellular radio access networks (e.g., universal mobile telecommunications system (UMTS) networks), network nodes can be referred to as Base Transceiver Stations (BTS), radio base station, radio network nodes, Base Stations (BSs), NodeB, eNodeB (e.g., evolved NodeB), and so on. In 5G terminology, the network nodes can be referred to as gNodeB (e.g., gNB) devices. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes (e.g., network device 702) can include but are not limited to: NodeB devices, Base Station (BS) devices, Access Point (AP) devices, and Radio Access Network (RAN) devices. The network nodes can also include multi-standard radio (MSR) radio node devices (e.g., MSR BS), comprising: an MSR BS, an eNode B, a network controller, a radio network controller (RNC), a base station controller (BSC), a relay, a donor node controlling relay, a base transceiver station (BTS), a transmission point, a transmission node, an Remote Radio Unit (RRU), a Remote Radio Head (RRH), nodes in distributed antenna system (DAS), and the like.

Methods that can be implemented in accordance with the disclosed subject matter, will be better appreciated with reference to the following flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 8:
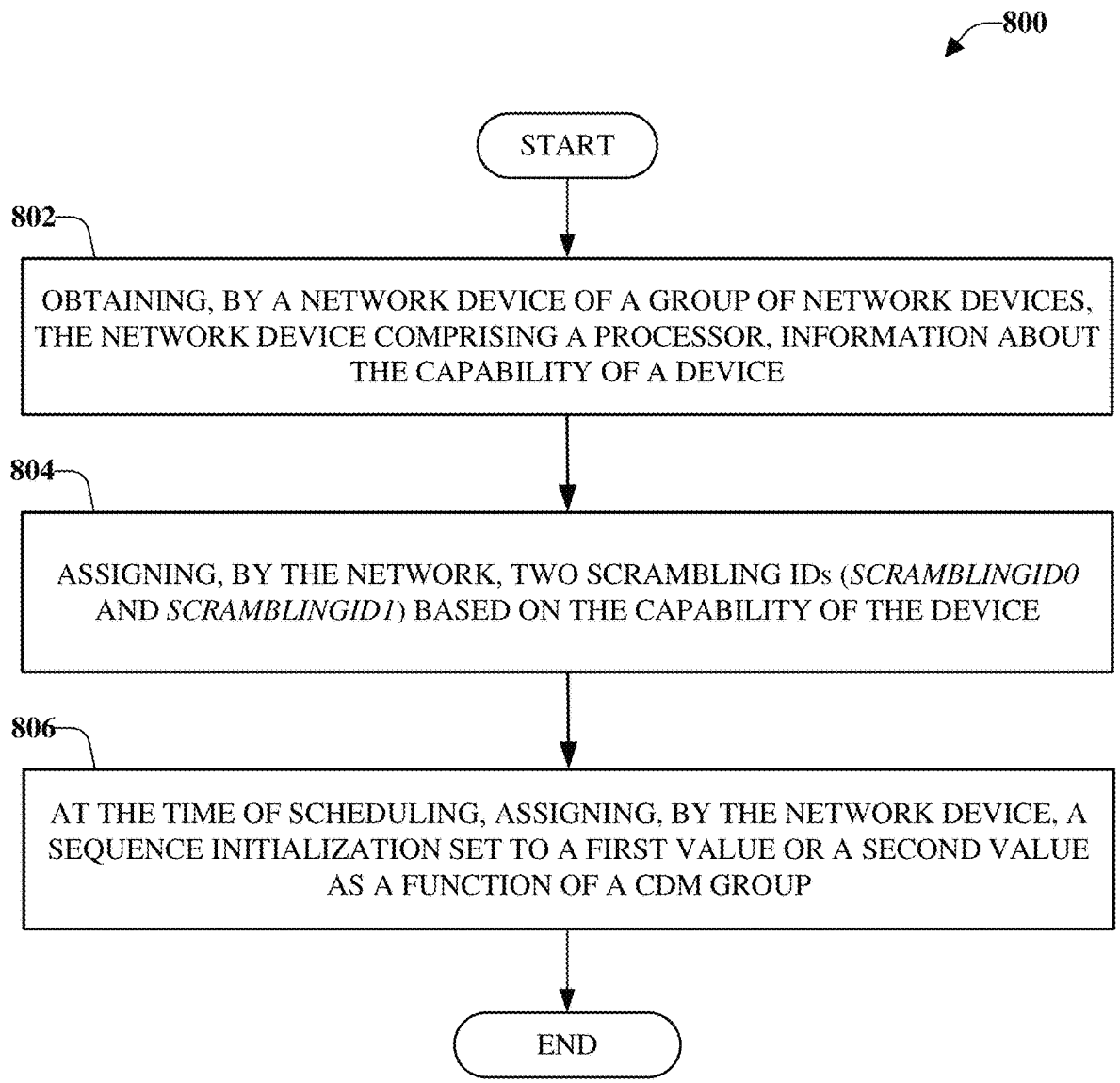
FIG. 8 illustrates a flowchart of an example, non-limiting method for generating a demodulation reference signal sequence in accordance with one or more embodiments described herein.

FIG. 8 illustrates a flowchart of an example, non-limiting, method 800 for generating a demodulation reference signal sequence in accordance with one or more embodiments described herein. Repetitive description of like elements employed in other embodiments described herein is omitted for sake of brevity.

Although FIG. 8 is illustrated and described with respect to a specific implementation (e.g., a network device), the disclosed aspects are not limited to this implementation. In some implementations, a system comprising a processor can perform the method 800 and/or other methods discussed herein. In other implementations, a device comprising a processor can perform the method 800 and/or other methods discussed herein. In other implementations, a machine-readable storage medium, can comprise executable instructions that, when executed by a processor, facilitate performance of operations, which can be the operations discussed with respect to the method 800 and/or other methods discussed herein.

At 802 of the method 800, information about the capability of a device (e.g., the communication device 704) can be obtained (e.g., via the transmitter/receiver component 710). In accordance with some implementations, the information can indicate a software version release number executing on the device. In a specific, non-limiting example, the information can indicate whether the device supports release 15 or release 16. Although discussed with respect to a software version release number, the capability of the device can be based on other criteria as discussed herein.

If the device supports Release 16, for example, two scrambling ids can be assigned to the device, at 804 (e.g., via the sequence creation component 708). For example, the two scrambling ids can be scramblingID0 and scrambling ID1.

This information can be communicated to the device such as, for example, via higher layer RRC signaling (DMRS-DownlinkConfig).

Further, as indicated at 806, at the time of scheduling, the device can be assigned a sequence initialization set to a first value or a second value as a function of the CDM group (e.g., via the sequence creation component 708). For example, the device can be assigned with $n_{SCID}=0$ for one CDM group and $n_{SCID}=1$ for the other CDM group in the downlink control channel.

Figure 9:
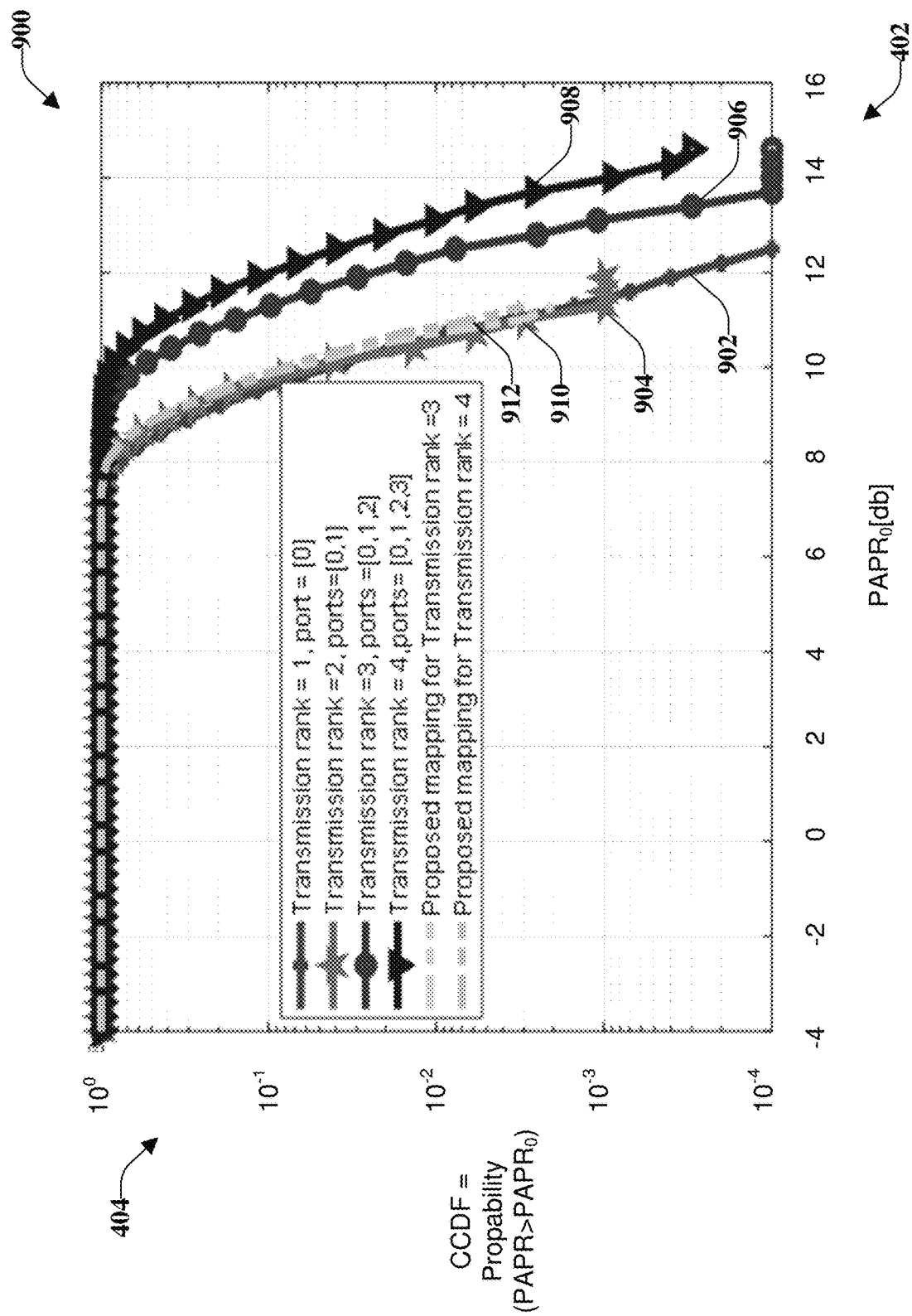
FIG. 9 illustrates an example graphic representation of performance with the disclosed aspects in accordance with one or more embodiments described herein.

FIG. 9 illustrates an example graphic representation 900 of performance with the disclosed aspects in accordance with one or more embodiments described herein. Repetitive description of like elements employed in other embodiments described herein is omitted for sake of brevity.

Illustrated on the horizontal axis 402 is $PAPR_0$, in decibels (dB). Illustrated on the vertical axis 404 is CCDF in probability ($PAPR>PAPR_0$). Transmission rank 1, port [0] is indicated by line 902; transmission rank 2, ports [0, 1] is indicated by line 904; transmission rank 3, ports [0, 1, 2] is indicated by line 906; transmission rank 4, ports [0, 1, 2, 3] is indicated by line 908. Further proposed mapping for transmission rank 3 is indicated by line 910 and proposed mapping for transmission rank 4 is indicated by line 912. Thus, it can be observed that with the disclosed aspects, the PAPR can be improved and can be almost equal to that of data. Accordingly, the network can schedule transmission ranks more than 2.

According to some implementations, the network node can assign the nscid (e.g., a scrambling identifier). As mentioned above, the network node (e.g., the network device 702) can obtain information about the UE capability (e.g., if it is a new release or old release). If it is a new release, the network node can assign two scrambling ids using higher layer signaling. At the time of scheduling, the network node can use the same value of nscid if the CDM groups are the same, or different values if the CDM groups are different. The CDM group information can be obtained from, for example, Table 3 below, which illustrates parameters for PDSCH DM-RS configuration type 1.

TABLE 3

| CDM group | | | $w_f(k')$ | | $w_t(l')$ | |
| --- | --- | --- | --- | --- | --- | --- |
| p | λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

Upon or after the UE obtains information about the nscid in DCI, the UE can generate the DMRS sequence for each port and can estimate the channel. From the estimated channel, the UE can decode the PDSCH.

Figure 10:
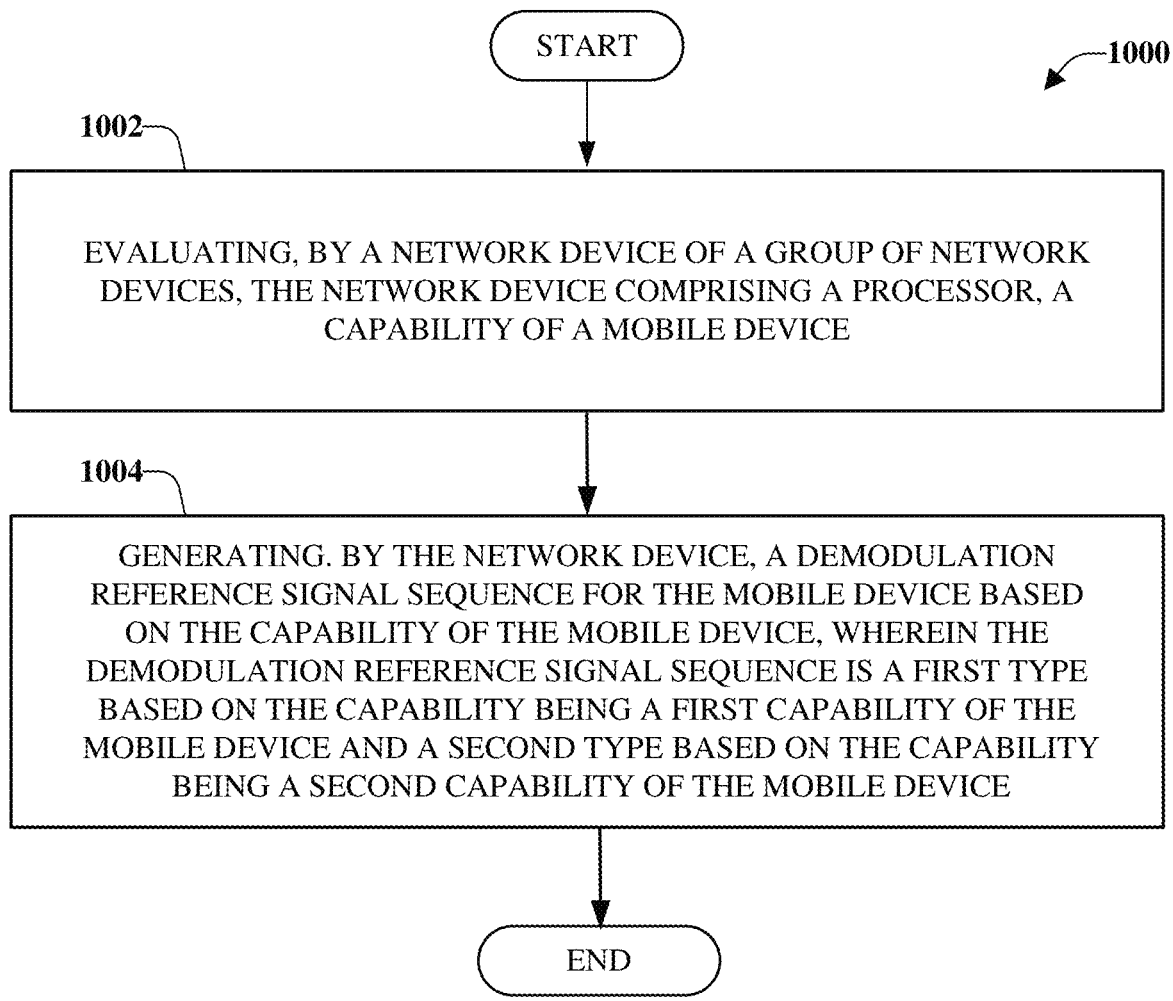
FIG. 10 illustrates a flowchart of an example, non-limiting, method for reducing peak to average power ratio in accordance with one or more embodiments described herein.

FIG. 10 illustrates a flowchart of an example, non-limiting, method 1000 for reducing peak to average power ratio in accordance with one or more embodiments described herein. Repetitive description of like elements employed in other embodiments described herein is omitted for sake of brevity.

Although FIG. 10 is illustrated and described with respect to a specific implementation (e.g., a network device), the disclosed aspects are not limited to this implementation. In some implementations, a system comprising a processor can perform the method 1000 and/or other methods discussed herein. In other implementations, a device comprising a processor can perform the method 1000 and/or other methods discussed herein. In other implementations, a machine-readable storage medium, can comprise executable instructions that, when executed by a processor, facilitate performance of operations, which can be the operations discussed with respect to the method 1000 and/or other methods discussed herein.

The method 1000 starts, at 1002, with evaluating a capability of a mobile device (e.g., via the analysis component 706). According to some implementations, the capability of the mobile device can be received from the mobile device. In an example, receiving the indication of the capability can comprise receiving an information element in a transmitted signal. The information element can be set to a first value based on the capability being the first capability and can be set to a second value based on the capability being the second capability. Alternatively, receiving the indication of the capability can comprise receiving information related to whether the mobile device supports a low peak-to-average power ratio sequence as the first capability or does not support the low peak-to-average power ratio sequence as the second capability.

In accordance with some implementations, the capability of the mobile device can be based on a software release version of the mobile device. For example, the first capability can be related to the software release version being a first software release version and the second capability can be related to the software release version being a second software release version.

Further, at 1004, a demodulation reference signal sequence for the mobile device can be generated based on the capability of the mobile device (e.g., via the sequence creation component 708). The demodulation reference signal sequence can be a first type based on the capacity being a first capability of the mobile device and a second type based on the capability being a second capability of the mobile device.

According to various implementations, the demodulation reference signal sequence is the second type, and generating the demodulation reference signal sequence can comprises generating two sequences. Generating the two sequences can comprise using a first bit for a first sequence of the two sequences of the demodulation reference signal sequence and using a second bit for a second sequence of the two sequences of the demodulation reference signal sequence.

In some implementations, the demodulation reference signal sequence is the second type, and generating the demodulation reference signal sequence can comprise assigning a first scrambling identifier and a second scrambling identifier to the mobile device.

The method can also comprise facilitating a transmission of the demodulation reference signal sequence to the mobile device (e.g., via the transmitter/receiver component 710). For example, the transmission can be sent via higher layer radio resource control signaling.

According to some implementations, the first capability can represent that the mobile device supports an advanced wireless communication capability of a fifth generation wireless network protocol. Further, the second capability can represent that the mobile device does not support the advanced wireless communication capability of the fifth generation wireless network protocol.

Described herein are systems, methods, articles of manufacture, and other embodiments or implementations that can facilitate generation of demodulation reference signals in advanced networks. Facilitating generation of demodulation reference signals for advanced networks can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (RAN) can enable the implementation of concepts such as Software-Defined Network (SDN) and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of Policy and Charging Rules Function (PCRF) network elements so that policies such as quality of service and traffic management and routing can be synchronized and managed end to end.

Figure 11:
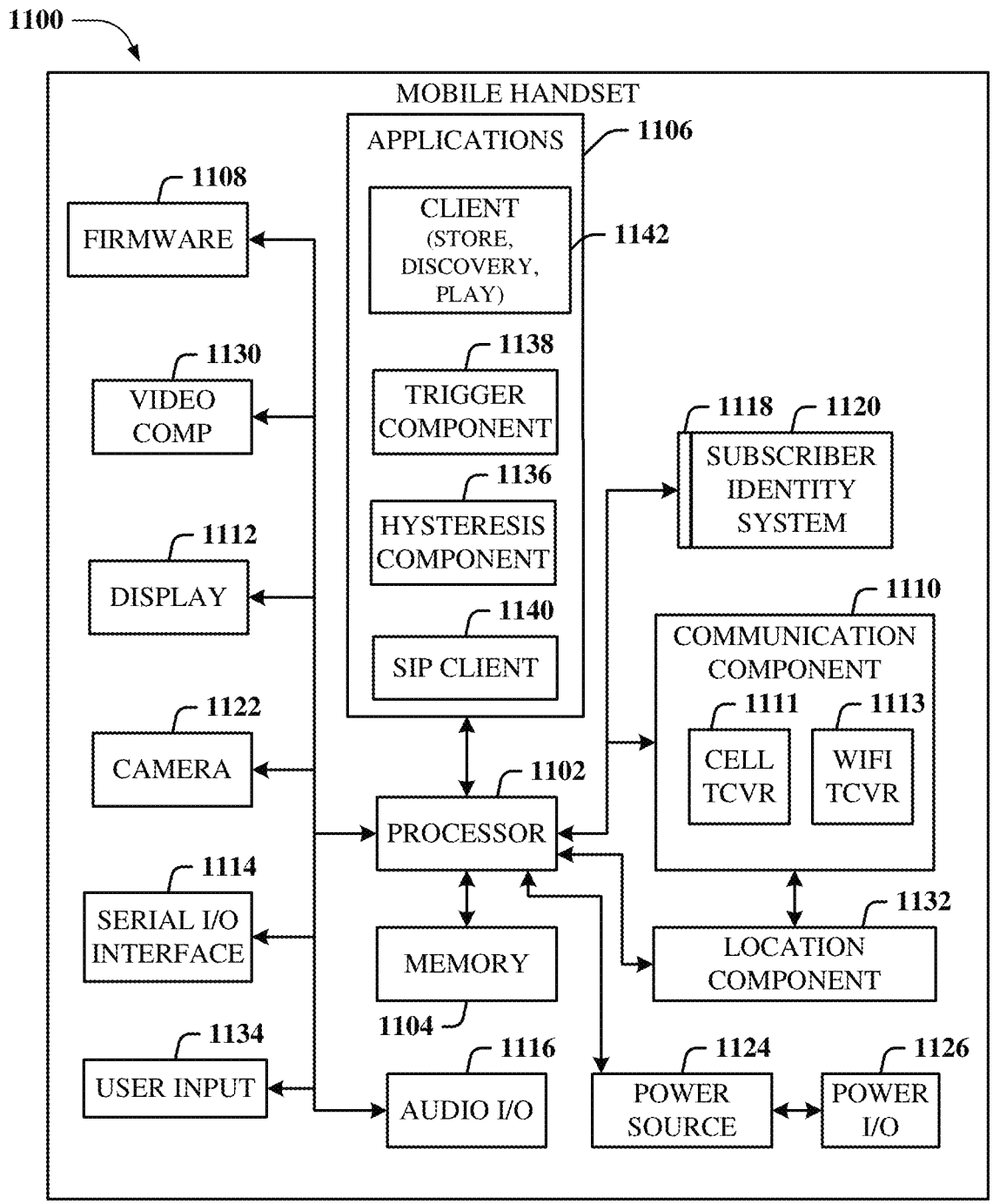
FIG. 11 illustrates an example block diagram of an example mobile handset operable to engage in a system architecture that facilitates wireless communications according to one or more embodiments described herein.

Referring now to FIG. 11, illustrated is an example block diagram of an example mobile handset 1100 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information, and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This can support updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1000, and updated by downloading data and software.

The handset 1100 can process IP data traffic through the communications component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or decoded format.

A video processing component 1122 (e.g., a camera) can be provided for decoding encoded multimedia content. The video processing component 1122 can aid in facilitating the generation, editing, and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touchscreen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1136 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 1110, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
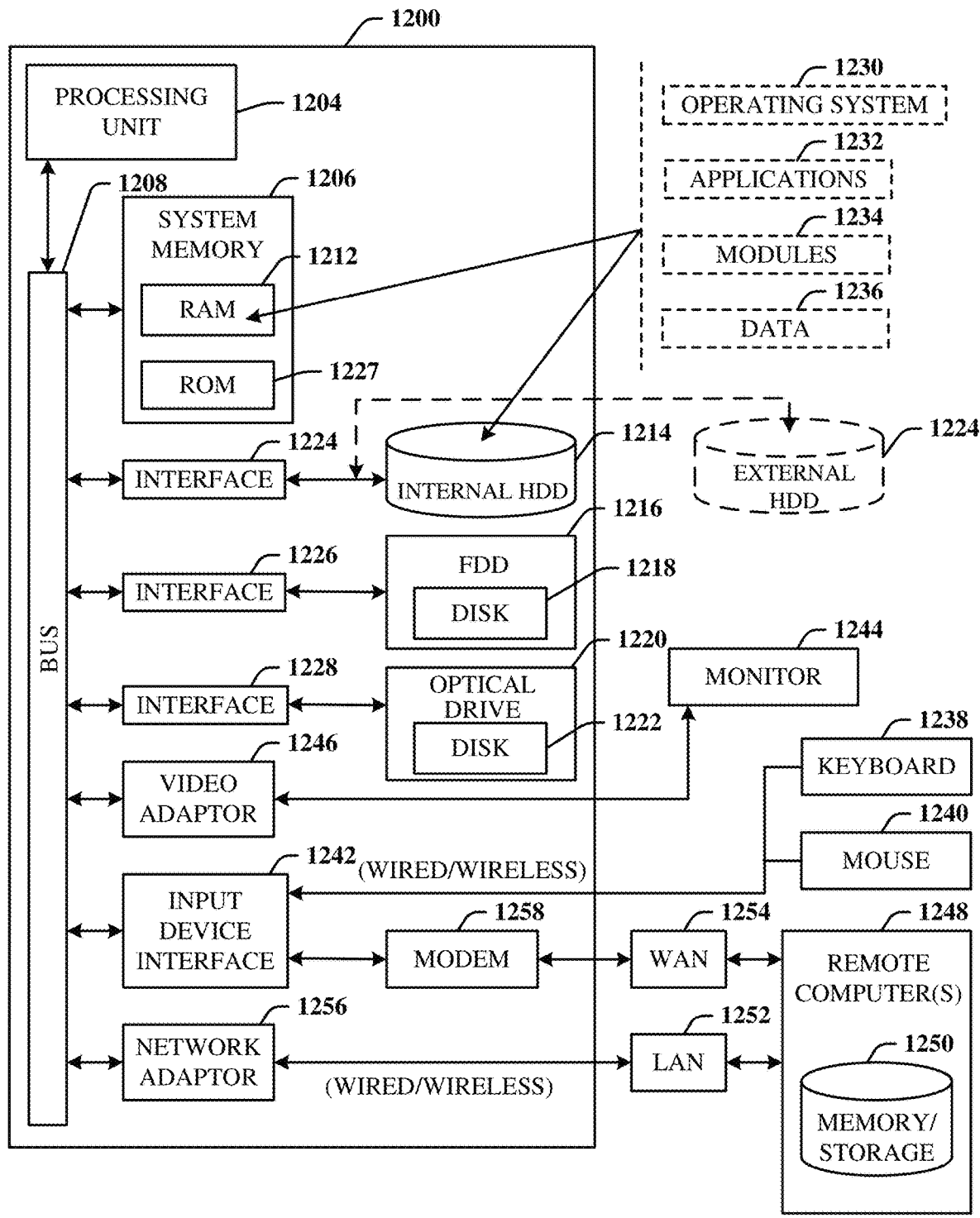
FIG. 12 illustrates an example block diagram of an example computer operable to engage in a system architecture that facilitates wireless communications according to one or more embodiments described herein.

Referring now to FIG. 12, illustrated is an example block diagram of an example computer 1200 operable to engage in a system architecture that facilitates wireless communications according to one or more embodiments described herein. The computer 1200 can provide networking and communication capabilities between a wired or wireless communication network and a server (e.g., Microsoft server) and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) can include a microphone, an IR remote control, a joystick, a game pad, a stylus pen, touchscreen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1200 is connected to the local network 1252 through a wired and/or wireless communication network interface or adapter 1256. The adapter 1256 can facilitate wired or wireless communication to the LAN 1252, which can also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, and so on), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 9 Mbps (802.11a) or 54 Mbps (802.11b) data rate, for example, or with products that contain both bands (dual band), so the networks can provide real-world performance similar to the basic 16 BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of ⅓ with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed.

While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   a processor; and
   a memory that stores executable instructions that, when executed by the processor, facilitate performance of operations, comprising:
   evaluating a capability of a user equipment, wherein the capability comprises a first capability based on the user equipment being capable of supporting a low peak-to-average power ratio sequence and a second capability based on the user equipment not being capable of supporting the low peak-to-average power ratio sequence; and
   generating a demodulation reference signal sequence for the user equipment based on the capability of the user equipment, wherein the demodulation reference signal sequence is a first type based on the capability being the first capability and a second type based on the capability being the second capability, wherein the generating comprises, based on the demodulation reference signal sequence being the second type:
   assigning a first scrambling identifier and a second scrambling identifier to the user equipment, and
   communicating the first scrambling identifier and the second scrambling identifier to the user equipment in two fields of a downlink control channel, and
   generating a random sequence comprising pseudo random sequences generated as a function of a slot number within a frame, orthogonal frequency-division multiplexing symbol number within a slot corresponding to the slot number, the first scrambling identifier, and the second scrambling identifier, and wherein the first scrambling identifier and the second scrambling identifier are based on different code division multiplexing groups, resulting in repetition of information transmitted by different antenna ports being avoided at the different antenna ports.

2. The system of claim 1, wherein the operations further comprise:
   prior to the evaluating, receiving, from the user equipment, an indication of the capability of the user equipment.

3. The system of claim 2, wherein the receiving comprises receiving an information element in a transmitted signal, and wherein the information element is set to a first value based on the capability being the first capability and set to a second value based on the capability being the second capability.

4. The system of claim 2, wherein the receiving comprises receiving information related to the first capability or the second capability.

5. The system of claim 1, wherein the generating comprises reducing a peak average power ratio in a communications network.

6. The system of claim 1, wherein the generating comprises generating the demodulation reference signal sequence based on antenna ports used for demodulation reference signals.

7. The system of claim 1, wherein the generating comprises generating the demodulation reference signal sequence based on code division multiplexing groups used for demodulation reference signals.

8. The system of claim 1, wherein the capability of the user equipment is based on a software release version of the user equipment, and wherein the first capability is related to the software release version being a first software release version and the second capability is related to the software release version being a second software release version.

9. The system of claim 1, wherein the demodulation reference signal sequence is the second type, and wherein the generating comprises generating two sequences comprising:
   using a first bit for a first sequence of the two sequences of the demodulation reference signal sequence; and
   using a second bit for a second sequence of the two sequences of the demodulation reference signal sequence.

10. The system of claim 1, wherein the operations further comprise:
    facilitating a transmission of the demodulation reference signal sequence to the user equipment via higher layer radio resource control signaling.

11. The system of claim 1, wherein the first capability represents that the user equipment supports an advanced wireless communication capability of a fifth generation wireless network protocol, and wherein the second capability represents that the user equipment does not support the advanced wireless communication capability of the fifth generation wireless network protocol.

12. A method, comprising:
    obtaining, by network equipment comprising a processor, information related to a capability of a user equipment, wherein the capability is a first capability that indicates the user equipment is capable of supporting a low peak-to-average power ratio sequence and a second capability that indicates the user equipment is not capable of supporting the low peak-to-average power ratio sequence;
    based on the capability of the user equipment being the first capability, assigning, by the network equipment, a first scrambling identifier to the user equipment and based on the capability of the user equipment being the second capability assigning both the first scrambling identifier and a second scrambling identifier to the user equipment;
    assigning, by the network equipment, a first scrambling identity information to the user equipment for a first code division multiplexing group and a second scrambling identity information to the user equipment for a second code division multiplexing group;
    transmitting, by the network equipment, the first scrambling identity information and the second scrambling identity information to the user equipment in different fields of a downlink control channel; and
    based on the capability of the user equipment being the second capability, generating, by the network equipment, a demodulation reference signal sequence based on a random sequence comprising pseudo random sequences generated as a function of a slot number within a frame, orthogonal frequency-division multiplexing symbol number within a slot corresponding to the slot number, the first scrambling identity information, and the second scrambling identity information, resulting in repetition of information transmitted by different antenna ports being avoided at the different antenna ports.

13. The method of claim 12, wherein the assigning of the first scrambling identity information and the second scrambling identity information is performed during scheduling of the user equipment.

14. The method of claim 12, further comprising:
based on the capability of the user equipment being the first capability, generating, by the network equipment, a demodulation reference signal sequence for the user equipment based on the first scrambling identity information.

15. The method of claim 12, wherein the assigning of the first scrambling identity information and the second scrambling identity information comprises determining the first code division multiplexing group and the second code division multiplexing group are different code division multiplexing groups.

16. The method of claim 12, wherein the assigning of the first scrambling identity information and the second scrambling identity information comprises reducing a peak average power ratio in a communications network.

17. A non-transitory machine-readable medium, comprising executable instructions that, when executed by a processor of user equipment, facilitate performance of operations, comprising:
receiving downlink control channel transmission comprising two fields respectively comprising a first scrambling identifier and a second scrambling identifier;
generating a demodulation reference signal sequence based on information received from network equipment, wherein the demodulation reference signal sequence is a first type based on a capability of a user equipment being determined to comprise a first capability and a second type based on the capability of the user equipment being determined to comprise a second capability other than the first capability, wherein the first capability is an ability, by the user equipment, to support a low peak-to-average power ratio sequence, and wherein the second capability is an inability, by the user equipment, to support the low peak-to-average power ratio sequence, and wherein the generating comprises:
based on the demodulation reference signal sequence being the first type, generating the demodulation reference signal sequence based on the first scrambling identifier and
based on the demodulation reference signal sequence being the second type, generating, the demodulation reference signal sequence based on a random sequence comprising pseudo random sequences generated as a function of a slot number within a frame, orthogonal frequency-division multiplexing symbol number within a slot corresponding to the slot number, the first scrambling identifier, and the second scrambling identifier, and wherein the first scrambling identifier and the second scrambling identifier are based on different code division multiplexing groups, resulting in repetition of information transmitted by different antenna ports being avoided at the different antenna ports; and
decoding a physical downlink shared channel based on a channel estimate determined as a function of the demodulation reference signal sequence.

18. The non-transitory machine-readable medium of claim 17, wherein the first scrambling identifier is associated with a first code division multiplexing group and the second scrambling identifier is associated with a second code division multiplexing group.

19. The non-transitory machine-readable medium of claim 17, wherein the generating comprises generating respective demodulation reference signal sequences for antenna ports of a group of antenna ports.

20. The non-transitory machine-readable medium of claim 17, wherein the capability of the user equipment is based on a software release version of the user equipment, and wherein the first capability is related to the software release version being a first software release version and the second capability is related to the software release version being a second software release version.

* * * * *